US012007079B2

(12) United States Patent
Feit et al.

(10) Patent No.: US 12,007,079 B2
(45) **Date of Patent: *Jun. 11, 2024**

(54) BACKLIT LAMP HAVING DIRECTIONAL LIGHT SOURCE

(71) Applicant: Feit Electric Company, Inc., Pico Rivera, CA (US)

(72) Inventors: Alan Barry Feit, Encino, CA (US); Jose Mata, La Puente, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,557

(22) Filed: May 9, 2023

(65) Prior Publication Data

US 2023/0272887 A1 Aug. 31, 2023

Related U.S. Application Data

(63) Continuation of application No. 17/698,271, filed on Mar. 18, 2022, now Pat. No. 11,680,687, which is a (Continued)

(51) Int. Cl.

*F21K 9/237* (2016.01)
*F21K 9/233* (2016.01)
*F21V 29/70* (2015.01)
*F21V 7/00* (2006.01)
*F21Y 105/16* (2016.01)
*F21Y 115/10* (2016.01)

(52) U.S. Cl.

CPC .............. *F21K 9/237* (2016.08); *F21K 9/233* (2016.08); *F21V 29/70* (2015.01); *F21V 7/0016* (2013.01); *F21Y 2105/16* (2016.08); *F21Y 2115/10* (2016.08)

(58) Field of Classification Search

CPC .... F21V 7/0016; F21V 29/505; F21V 29/506; F21V 29/507; F21V 29/70; F21K 9/23; F21K 9/232; F21K 9/235; F21K 9/237; F21K 9/238

See application file for complete search history.

(56) References Cited

U.S. PATENT DOCUMENTS 9,103,510 B2 * 8/2015 Feit ......................... F21V 5/048
10,415,766 B2 * 9/2019 Feit ......................... F21K 9/233
(Continued)

*Primary Examiner* — Abdulmajeed Aziz
*Assistant Examiner* — Steven Y Horikoshi
(74) *Attorney, Agent, or Firm* — Alston & Bird LLP

(57) ABSTRACT

An example embodiment of a backlit lamp comprises a housing, a forward facing directional light source and a rear facing directional light source. The housing may comprise a bowl portion comprising a first joining end and a forward emitting end; and a neck portion comprising a second joining end. The bowl and neck portions are joined at the first and second joining ends. The forward facing directional light source is mounted within the housing and configured to emit light in the direction of the forward emitting end. The rear facing directional light source is mounted within the housing and configured to emit light in an opposite direction from the light emitted by the forward facing directional light source. In an example embodiment, the forward facing and rear facing directional light source comprise light emitting diodes (LEDs).

19 Claims, 7 Drawing Sheets

Related U.S. Application Data continuation of application No. 16/987,730, filed on Aug. 7, 2020, now Pat. No. 11,306,877, which is a continuation of application No. 16/519,733, filed on Jul. 23, 2019, now Pat. No. 10,774,996, which is a continuation of application No. 15/445,304, filed on Feb. 28, 2017, now Pat. No. 10,415,766.

(56) References Cited

U.S. PATENT DOCUMENTS 10,774,996 B2 * 9/2020 Feit .......... F21K 9/237
11,306,877 B2 * 4/2022 Feit .......... F21K 9/233
11,680,687 B2 * 6/2023 Feit .......... F21K 9/233 362/234
2005/0243552 A1 11/2005 Maxik
2008/0007953 A1 1/2008 Keller et al.
2010/0060130 A1 3/2010 Li
2010/0103679 A1 4/2010 Lee
2011/0074289 A1 3/2011 Van de Ven et al.
2011/0089831 A1 4/2011 Takahasi et al.
2011/0103054 A1 * 5/2011 Chang .......... F21V 7/0016 362/235
2011/0122630 A1 5/2011 Tan et al.
2011/0170289 A1 7/2011 Allen et al.
2011/0233593 A1 9/2011 Kawagoe et al.
2011/0242817 A1 10/2011 Chowdhury et al.
2012/0113638 A1 5/2012 Uemoto et al.
2012/0134133 A1 * 5/2012 Kang .......... F21V 7/0058 362/235
2012/0268942 A1 * 10/2012 Beregszaszi .......... F21V 29/505 362/294
2013/0068439 A1 3/2013 Zeng
2013/0182432 A1 7/2013 Yoo et al.
2014/0160754 A1 * 6/2014 Lee .......... F21V 5/04 362/249.02
2014/0254154 A1 9/2014 Catalano
2014/0347852 A1 11/2014 Feit
2015/0377421 A1 12/2015 Chen
2017/0321864 A1 * 11/2017 Dellock .......... F21S 45/48
2018/0180272 A1 6/2018 Zheng et al.
2018/0245746 A1 8/2018 Feit et al.
2019/0353308 A1 11/2019 Feit et al.
2020/0363021 A1 11/2020 Feit et al.
2022/0205596 A1 6/2022 Feit et al.

* cited by examiner

BACKLIT LAMP HAVING DIRECTIONAL LIGHT SOURCE

CROSS-REFERENCE TO RELATED APPLICATIONS

This application is a continuation of and claims the benefit and priority of U.S. Nonprovisional patent application Ser. No. 17/698,271, filed Mar. 18, 2022, which application is also a continuation of and claims the benefit and priority of U.S. Nonprovisional patent application Ser. No. 16/987,730, filed Aug. 7, 2020 and granted as U.S. Pat. No. 11,306,877, which application/patent is also a continuation of and claims the benefit and priority of U.S. Nonprovisional patent application Ser. No. 16/519,733, filed Jul. 23, 2019 and granted as U.S. Pat. No. 10,774,996, which application/patent is also a continuation of and claims the benefit and priority of U.S. Nonprovisional patent application Ser. No. 15/445,304, filed Feb. 28, 2017 and granted as U.S. Pat. No. 10,415,766; the entire contents of all of which as are hereby incorporated by reference herein.

BACKGROUND

Conventional parabolic aluminized reflector (PAR) and multi-faceted reflector (MR) halogen lamps, also known as flood lamps, are used in a variety of contexts because of their white light (generally 2800-3200 K) and narrow beam spread (generally 8-60 degrees). However, halogen lamps operate at high temperatures and are capable of reaching temperatures of 260° C. (500° F.) or more during operation. Thus, halogen lamps can be dangerous. The high heat output of halogen lamps means they are also inefficient, as a significant fraction of energy is converted to infrared radiation instead of visible radiation. In order to help protect against lamp breakage due to the high operating temperature of PAR and MR halogen lamps or due to possible contact of the lamp with moisture, a main portion of most PAR and MR halogen lamps is made of hard-pressed glass.

When used in a track lighting fixture, for example, traditional PAR and MR lamps generally fail to provide an aesthetically pleasing appearance. In particular, PAR and MR lamps are generally configured to provide a spot-light type light. However, this results in a forward part of the shade being illuminated by the light emitted by the lamp, while a back part of the shade is unilluminated.

Thus, a need exists in the art for a safe and efficient replacement for PAR and MR halogen lamps that provides an aesthetically pleasing appearance and meets the desired criteria of a spot-light type light.

BRIEF SUMMARY

The following and other advantages are provided by the backlit lamp described herein. For example, in an example embodiment, a backlit PAR or MR lamp is provided. In an example embodiment, the light engine of the backlit lamp is directional. For example, the light engine of the backlit lamp may be a light emitting diode (LED). The backlit lamp provides a lamp with the look and lighting characteristics of a traditional parabolic aluminized reflector (PAR) or multi-faceted reflector (MR) halogen lamp, but which operates more efficiently and at lower temperatures and that is backlit.

According to an aspect of the present invention, a light emitting diode (LED) lamp is provided. I an example embodiment, the LED lamp comprises a housing, one or more forward facing LED packages, and at least one rear facing LED package. The housing comprises a bowl portion comprising a first joining end and a forward emitting end; and a neck portion comprising a second joining end. The bowl portion and the neck portion are joined at the first joining end and the second joining end. The one or more forward facing LED packages are mounted within the housing and configured to emit light in the direction of the forward emitting end. The at least one rear facing LED is mounted within the housing and configured to emit light away from the forward emitting end.

In an example embodiment, the LED lamp further comprises a heat sink. The heat sink comprises a sloped portion; and a bottom portion. The bottom portion comprises a forward surface and a rear surface. The sloped portion extends from a perimeter of the bottom portion and the forward surface is bordered by the sloped portion. In an example embodiment, the one or more forward facing LED packages are secured to the forward surface, and the at least one rear facing LED package is secured to the rear surface. In an example embodiment, the one or more forward facing LED packages are mounted on a forward board, the at least one rear facing LED package is mounted on a component board, the forward board is mounted to the forward surface, and the component board is mounted to the rear surface. In an example embodiment, one or more driver circuit components, the one or more driver circuitry components being mounted on the component board. In an example embodiment, the heat sink is mounted within the bowl portion such that an exterior surface of the sloped portion is adjacent an interior surface of the bowl portion. In an example embodiment, an interior surface of the bowl portion comprises a coating. In an example embodiment, the neck portion further comprises a base end disposed opposite the second joining end and a neck cavity disposed between the base end and the second joining end. In an example embodiment, the neck cavity comprises an open space having component electrical leads passing there-through. In an example embodiment, the component electrical leads provide electrical communication between one or more electrical contacts of a base secured to the base end and one or more driver circuitry components mounted within the housing. In an example embodiment the neck cavity does not contain any driver circuitry components. In an example embodiment, the LED lamp further comprises a base secured to the base end; and an optical component enclosing the forward emitting end. In an example embodiment, a sidewall of the neck portion is (a) clear or (b) frosted.

According to another aspect of the present invention, a backlit lamp is provided. In an example embodiment the backlit lamp comprises a housing, a forward facing directional light source and a rear facing directional light source. The housing comprises a bowl portion comprising a first joining end and a forward emitting end; and a neck portion comprising a second joining end. The bowl portion and the neck portion are joined at the first joining end and the second joining end. The forward facing directional light source is mounted within the housing and configured to emit light in the direction of the forward emitting end. The rear facing directional light source is mounted within the housing and configured to emit light in an opposite direction from the light emitted by the forward facing directional light source.

In an example embodiment, the neck portion further comprises a base end and a sidewall extending between the base end and the second joining end and at least a portion of light emitted by the rear facing directional light source passes through the sidewall. In an example embodiment, the backlit lamp further comprises a base secured to the base end, the base end being an end of the neck and disposed opposite the second joining end; and an optical component enclosing the forward emitting end. In an example embodiment, a sidewall of the neck portion is (a) clear or (b) frosted. In an example embodiment, the neck portion further comprises a base end disposed opposite the second joining end and a neck cavity disposed between the base end and the second joining end. In an example embodiment, the neck cavity comprises an open space having component electrical leads passing there-through. In an example embodiment, the electrical leads provide electrical communication between one or more electrical contacts of a base secured to the base end and the rear and forward facing directional light sources.

BRIEF DESCRIPTION OF THE SEVERAL VIEWS OF THE DRAWING(S)

Brief reference will now be made to the accompanying drawings, which are not necessarily drawn to scale, and wherein.

Additional details regarding various features illustrated within the Figures are described in further detail below.

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

In an example embodiment, the backlit lamp is a PAR and/or MR lamp that comprises a directional light source. In an example embodiment, the directional light source comprises one or more light emitting diodes (LEDs). Applicant's own U.S. Pat. No. 9,103,510 provides a discussion of PAR and MR lamps comprising LED directional light sources and is incorporated herein by reference in its entirety; details relative thereto not explicitly described herein should be understood by reference.

Figure 1:
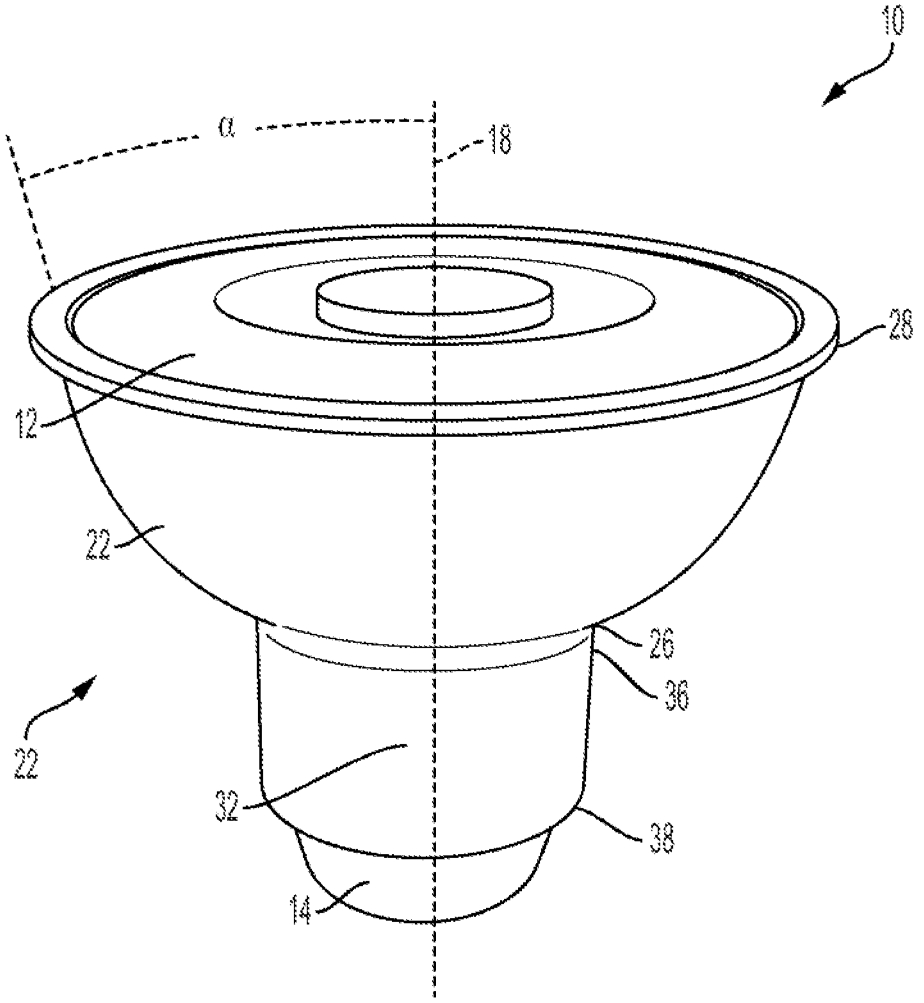
FIG. 1 shows a perspective view of a backlit lamp, according to an example embodiment of the present invention.
Figure 2:
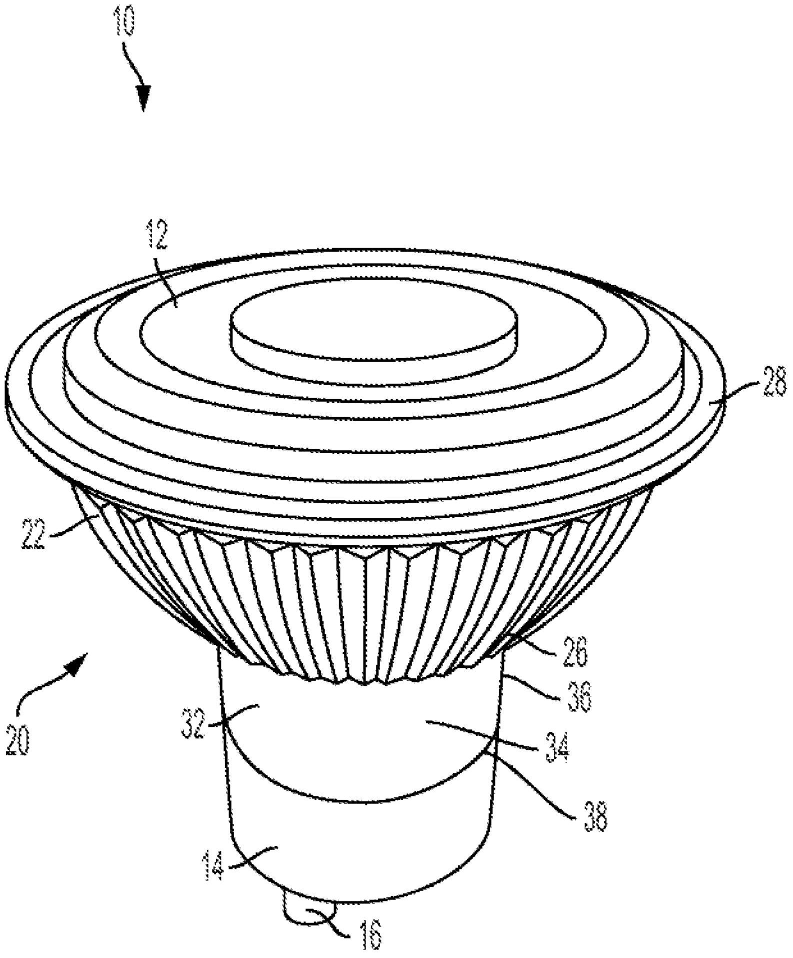
FIG. 2 shows another perspective view of a backlit lamp, according to an example embodiment of the present invention.
Figure 3:
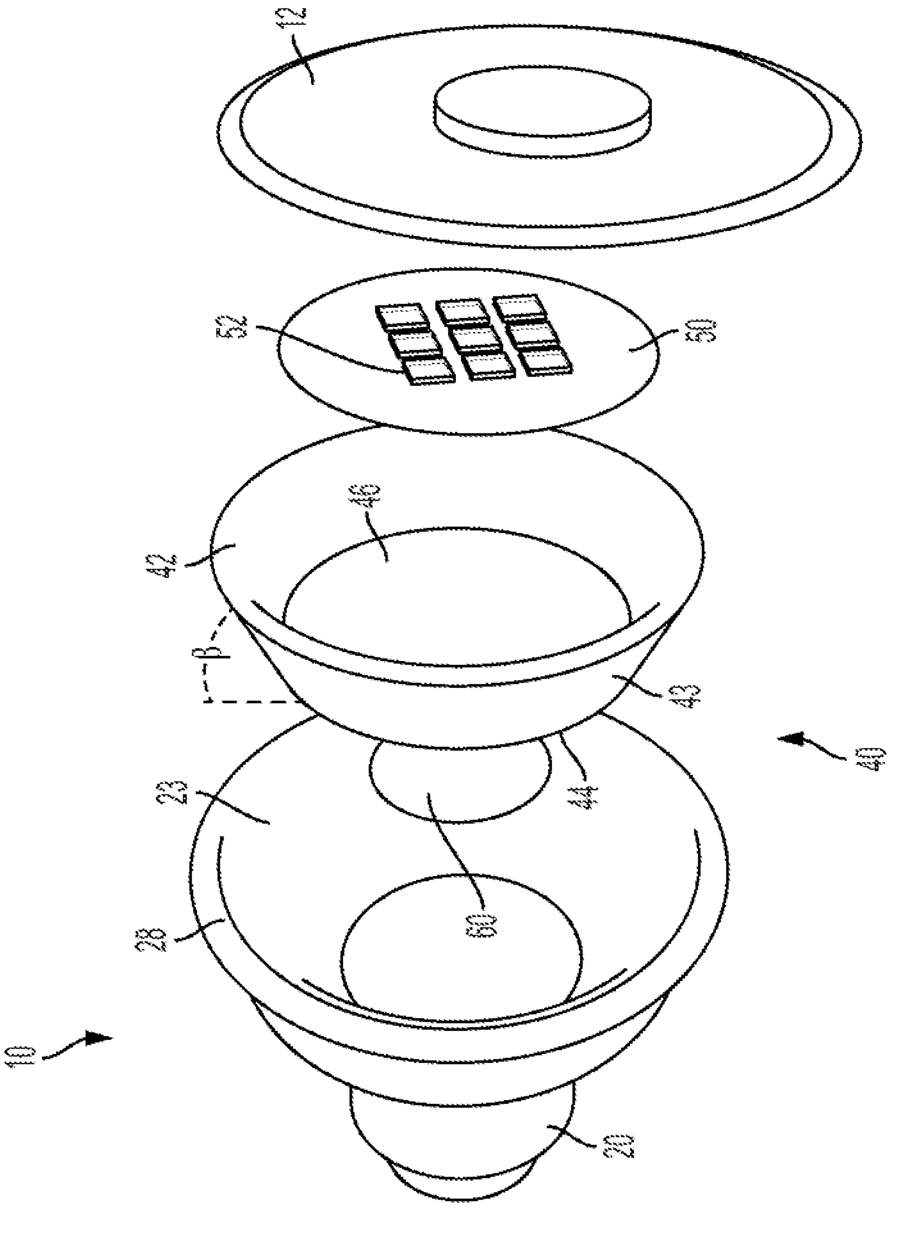
FIG. 3 shows an exploded view of a backlit lamp, according to an example embodiment of the present invention.
Figure 4:
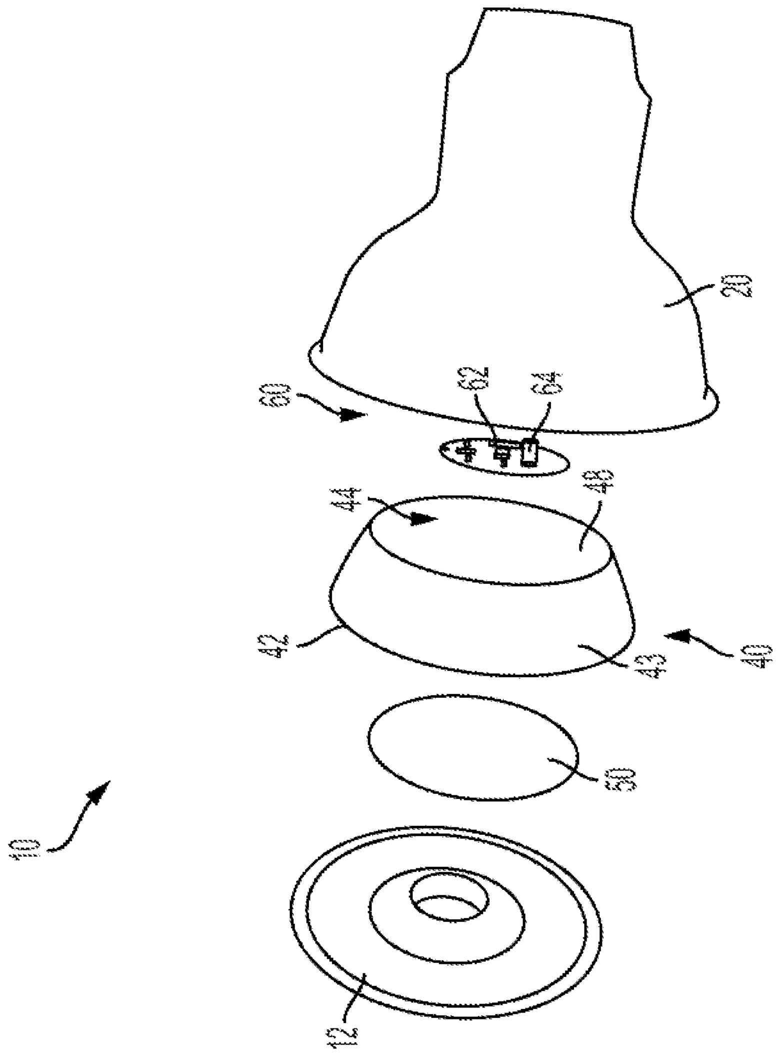
FIG. 4 shows another exploded view of a backlit lamp, according to an example embodiment of the present invention.

As shown in FIGS. 1 and 2, an exemplary backlit lamp 10 may according to various embodiments comprise a base 14, a housing 20, and an optical component 12. In example embodiments, the base 14 comprises one or more electrical contacts 16. In example embodiments, the housing 20 comprises a bowl portion 22 and a neck portion 32. The bowl portion 22 comprises a forward emitting end 28 and a first joining end 26. The neck portion 32 comprises a second joining end 36 and a base end 38. The optical component 12 is configured to enclose the forward emitting end 28 of the housing 20. The bowl portion 22 and the neck portion 32 join at the first joining end 26 and the second joining end 36. The base 14 is secured to the base end 38 of the neck portion 32.

In example embodiments, the backlit lamp 10 comprises a base 14. In various embodiments, the base 14 comprises one or more electrical contacts 16. In various embodiments, the base 14 and/or the electrical contacts 16 are configured to mechanically and/or electrically connect the backlit lamp 10 to a lighting fixture and/or the like. For example, the base 14 and/or electrical contacts 16 may be configured to secure the backlit lamp 10 within a socket of a lighting fixture, lighting device, and/or the like. For example, the base 14 and/or the electrical contacts 16 may be configured to screw, snap, rotate into the socket or secure the backlit lamp 10 via a friction fitting. The base 14 and/or electrical contacts 16 may be any of a variety of lamp bases commonly known in the art. For example, in various embodiments, base 14 and/or the electrical contacts 16 may comprise a threaded portion configured to screw the backlit lamp 10 into a light socket. In other embodiments, base 14 and/or the electrical contacts 16 may comprise a two pin, turn and lock, bayonet, or other mechanism configured to facilitate engagement and/or locking relative to an adjacent light socket, as is commonly known and understood in the art.

Figure 5B:
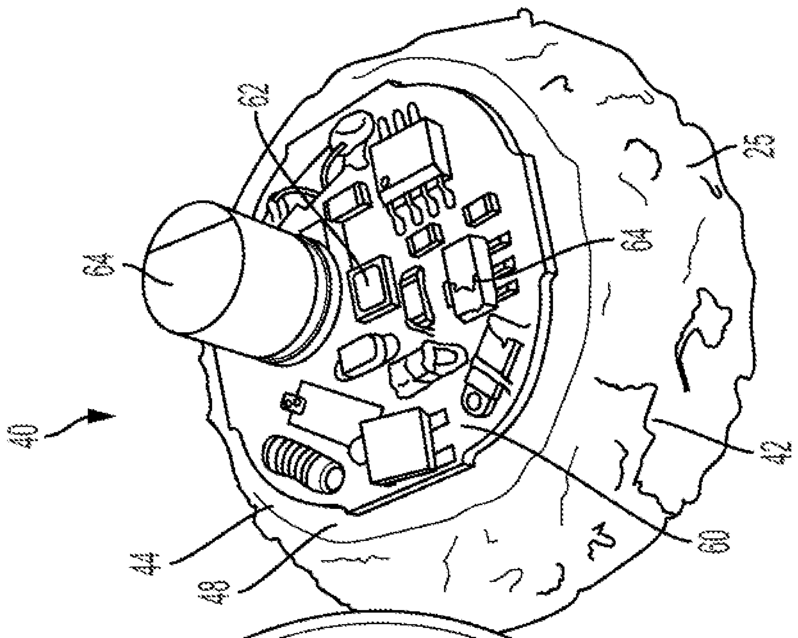
FIG. 5B shows the rear facing side of a heat sink and the component board mounted thereto, according to an example embodiment of the present invention.
Figure 5A:
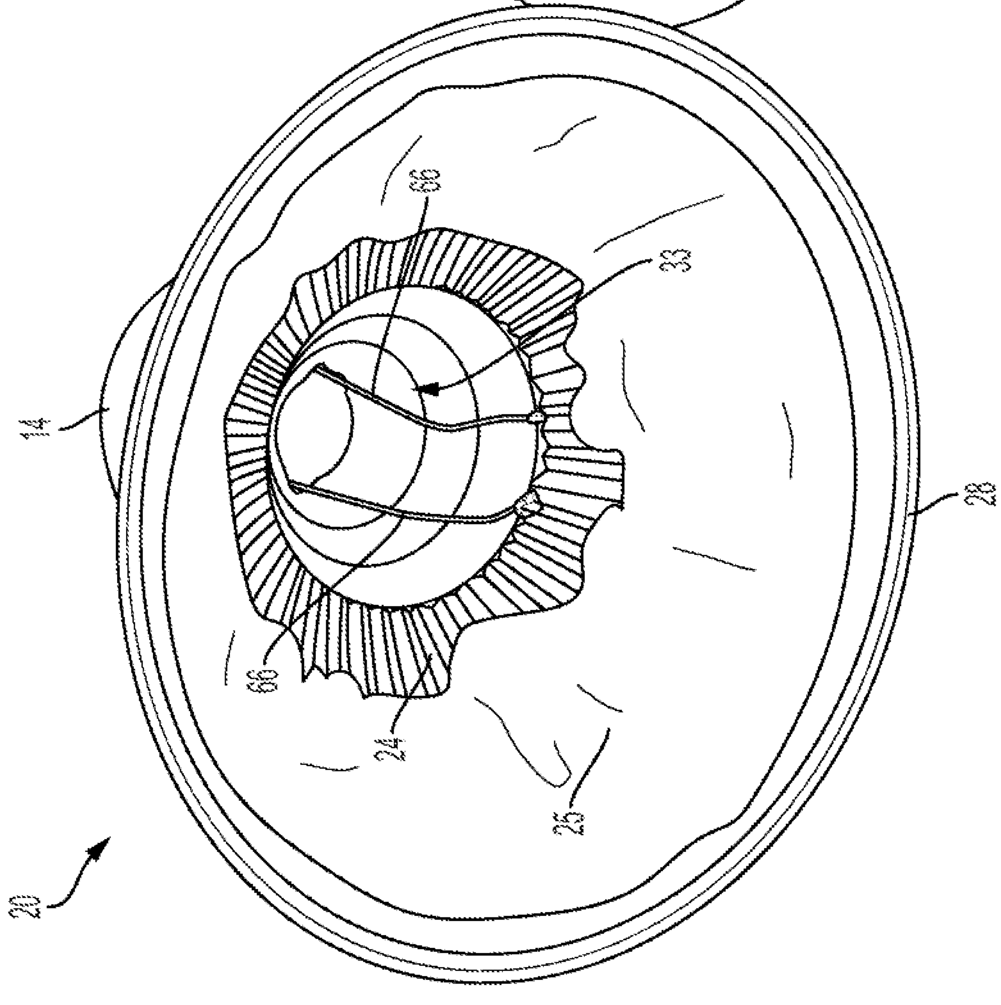
FIG. 5A shows the inside of a housing of a backlit lamp, according to an example embodiment of the present invention.
Figure 6:
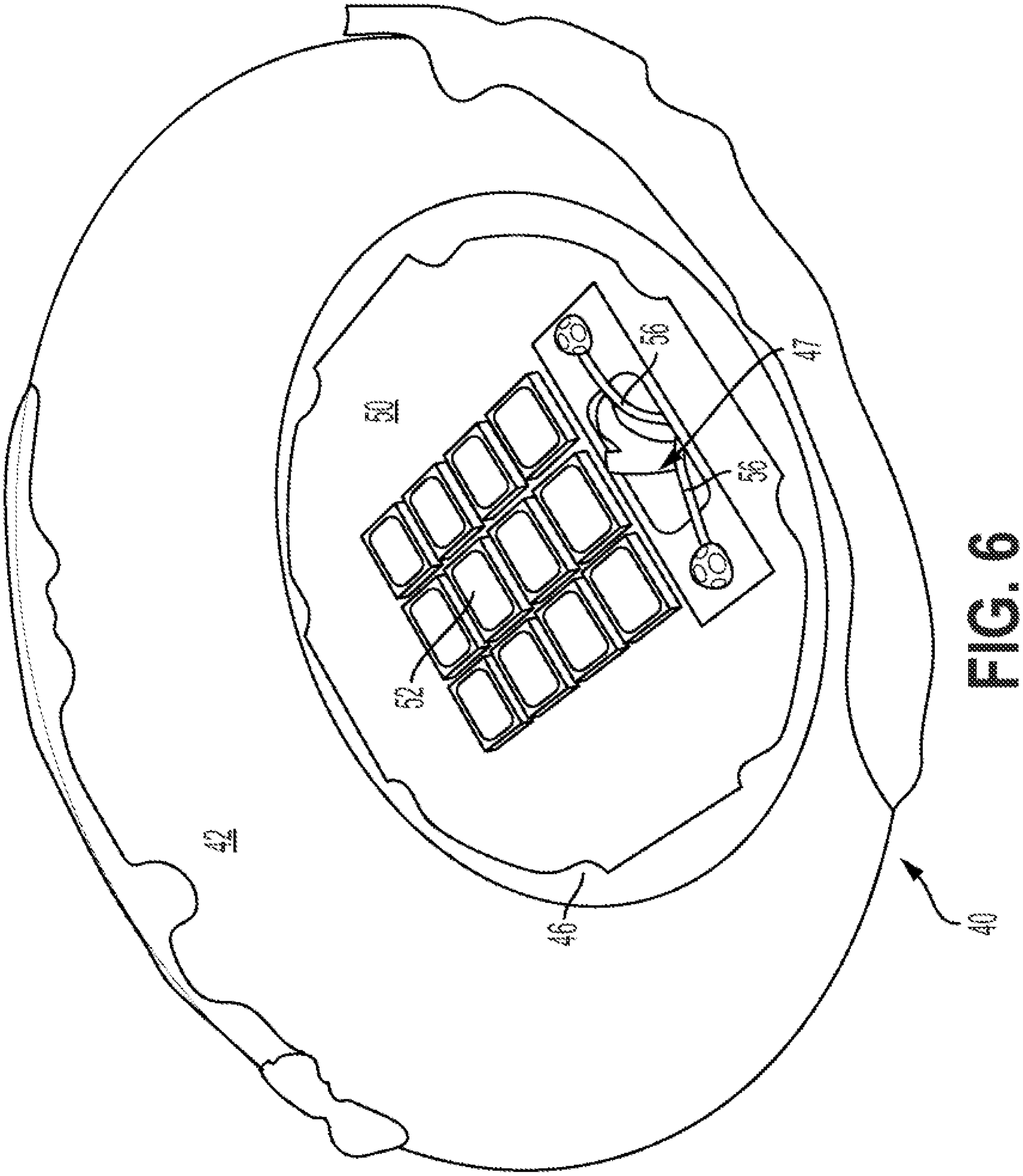
FIG. 6 shows the forward-facing side of a heat sink and the forward-facing board mounted therein, according to an example embodiment of the present invention.
Figure 7C:
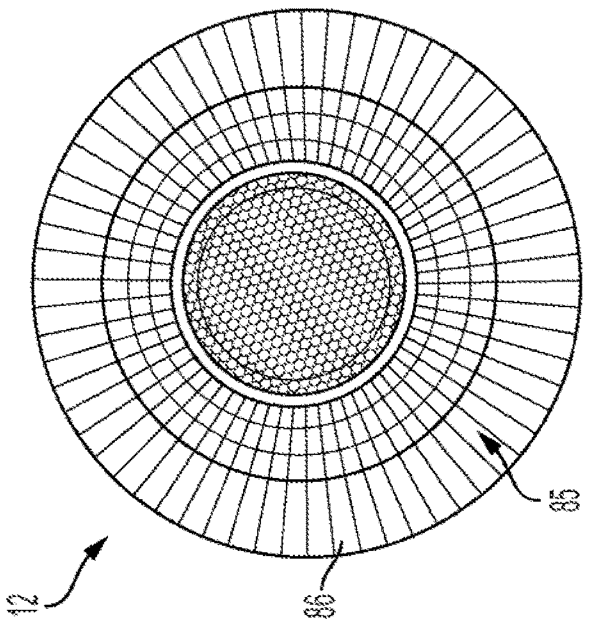
FIG. 7C shows a back view of the backlit lamp optical component shown in FIG. 7A.
Figure 7D:
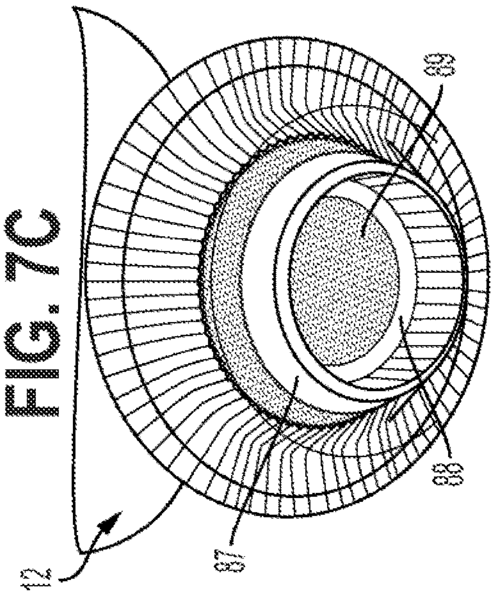
FIG. 7D shows a back perspective view of the backlit lamp optical component shown in FIG. 7A.
Figure 7A:
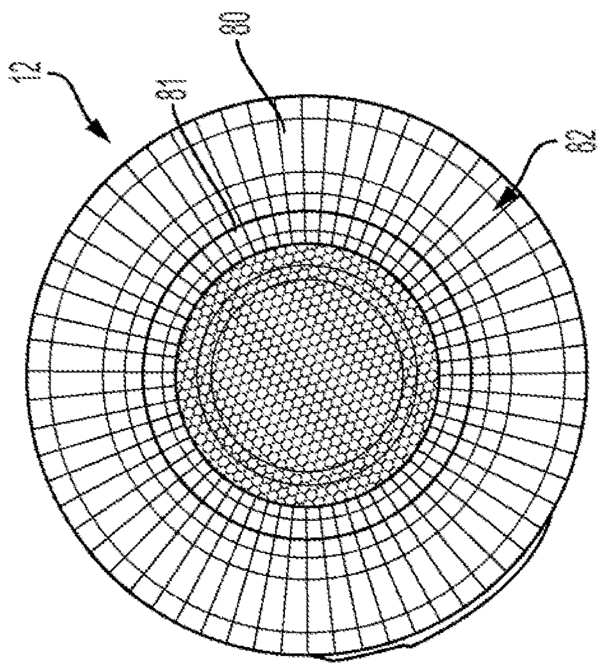
FIG. 7A shows a front view of a backlit lamp optical component, according to an example embodiment of the present invention.
Figure 7B:
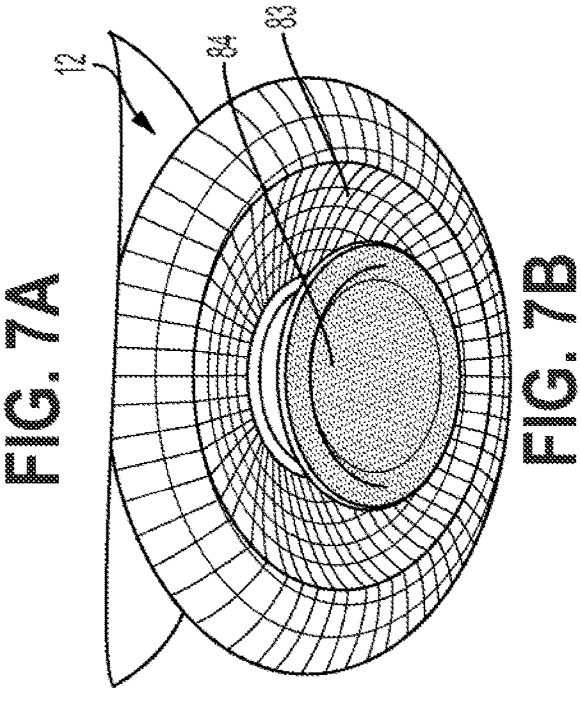
FIG. 7B shows a front perspective view of the backlit lamp optical component shown in FIG. 7A.

In various embodiments, the base 14 and/or the electrical contacts 16 may be configured to secure the backlit lamp 10 into a socket of a lighting fixture, lamp, wall sconce, can, spotlight, or other socket. The base 14 and/or the electrical contacts 16 may be configured to connect the electrical components of the backlit lamp 10 (e.g., driver circuitry components 64, light source, and/or the like) to line voltage or to another source of electrical power through the component electrical leads 66. For example, the base 14 maybe include one or more electrical contacts 16 configured to provide an electrical connection to corresponding contacts within the socket. The electrical contacts 16 may be in electrical communication with the component electrical leads 66 within the backlit lamp 10 through a first end of the component electrical leads. A second end of the component electrical leads 66, disposed opposite the first end of the component electrical leads 66 may be in electrical communication with a component board 60, one or more driver circuitry components 64, and/or the light source of the backlit lamp 10, as shown in FIGS. 5A and 5B. Thus, the base 14 and/or the electrical contacts 16 may be configured to receive the electrical power from the socket contacts and transmit the electrical power to the electrical components of the backlit lamp 10.

In various embodiments, base 14 and/or electrical contacts 16 are made of metal, such as aluminum, stainless steel, or the like, or any other material commonly known and recognized to be suitable for such applications. In an example embodiment, the base 14 is made of plastic or a polymeric material and the electrical contacts 16 are made of metal or other conducting material. As non-limiting examples, the base 14 may be a GU10, E26, E27, E11, E12, E14, E17, side double prong, bottom double prong, pin, wedge, E39, E40, GU, and/or other base.

As illustrated in FIGS. 1 and 2, in example embodiments, the base 14 is secured to the base end 38 of the housing 20. In example embodiments, the housing 20 comprises a neck portion 32 and a bowl portion 22. In an example embodiment, the neck portion 32 and the bowl portion 22 may be integrally formed. In an example embodiment, the neck portion 32 and the bowl portion 22 may be formed and/or manufactured separately and joined and/or secured together at the first joining end 26 of the bowl portion 22 and the second joining end 36 of the neck portion 32. In various embodiments, the housing 20, and/or a portion thereof (e.g., the neck portion 32 and/or the bowl portion 22), may be made of plastic, ceramic material, metal, aluminum, glass, hard-pressed glass, or some other suitable material. In various embodiments, the housing 20, and/or a portion thereof, may be clear, frosted, transparent, translucent, semi-transparent, semi-translucent, and/or the like. In an example embodiment, the housing 20, and/or a portion thereof, may be made of a smart glass and/or the like that may transition between a clear and frosted appearance. In some embodiments, the exterior surface of the housing 20, and/or a portion thereof, may be aluminized to provide a shiny silver appearance and/or provided with a coating or finish configured to provide an aesthetically pleasing appearance.

In an example embodiment, the housing 20 and/or a portion thereof, may define a longitudinal axis 18. For example, the longitudinal axis 18 may be an axis of rotational symmetry of the housing 20 and/or a portion thereof.

In various embodiments, the neck portion 32 comprises a base end 38 and a second joining end 36. The neck portion 32 meets and/or joins to the bowl portion 22 (e.g., the first joining end 26) at the second joining end 36. A sidewall 34 extends between the based end 38 and the second joining end 36. In an example embodiment, in a cross-section of the neck portion 32 taken perpendicular to the longitudinal axis 18, the sidewall 34 defines a circle, ellipse, polygon, or irregular shape. In example embodiments, the sidewall 34 defines the surface of a cylinder, regular prism, partial cone, and/or the like. In example embodiments, the sidewall 34 is at least partially translucent and may be clear, frosted, and/or the like. In particular, light from a directional light source mounted within the housing 20 may be emitted from the backlit lamp 10 through the sidewall 34 to provide general illumination from the back or rear end of the backlit lamp 10. In an example embodiment, the sidewall 34 defines an interior region of the neck portion 32. The interior region comprises a neck cavity 33. The neck cavity 33 may be generally empty. For example, the component electrical leads 66 may pass through the neck cavity 33, but otherwise the neck cavity 33 may be devoid of other lamp components (e.g., light sources, driver circuitry components 64, and/or the like). For example, the neck cavity 33 may be free of objects or components that may interfere with light emitted by a directional light source mounted within the housing from being emitted through the portion of the sidewall 34 that borders, confines, and/or defines the neck cavity 33. Thus, in an example embodiment, the electrical components of the backlit lamp 10, other than the component electrical leads 66, are mounted within the housing 20 proximate the location of the first and second joining ends 26, 36.

In various embodiments, the housing 20 of the backlit lamp 10 comprises a bowl portion 22. In general, the bowl portion 20 comprises a forward emitting end 28 and a first joining end 26. In an example embodiment, the spot-light type light provided by an example embodiment of the backlit lamp 10 is emitted outward from the forward emitting end 28. For example, a directional light source within the backlit lamp 10 may be configured to emit a spot like type light out the forward emitting end 28. For example, the backlit lamp 10 may be configured to emit a beam of light having a beam angle $\alpha$, as shown in FIG. 1.

In an example embodiment, the bowl portion 22 may be a partially conical in shape (e.g., at least a portion of the bowl portion 22 may be shaped as a partial right circular cone). For example, the bowl portion 22 may have a circular, elliptical, polygonal, or irregular cross-section along a plane perpendicular to the longitudinal axis 18. In an example embodiment, the sides of the bowl portion 22 may be curved so as to provide a curved and/or parabolic cross-section along a plane comprising and/or parallel to the longitudinal axis 18. In an example embodiment, the longitudinal axis 18 of the bowl portion 22 may align with a longitudinal axis of the neck portion 32. Thus, an example embodiment of the backlit lamp 10 and/or housing 20 has a rotational symmetry, about the longitudinal axis 18.

In an example embodiment, the interior surface 23 of the bowl portion 22, and/or a portion thereof, may be coated with a coating 24, as shown in FIG. 5A. In one example embodiment, the coating 24 is an aluminum coating. In general the coating 24 may be configured to be a reflective coating, a heat absorbing and/or radiating coating, and/or the like. In an example embodiment, the exterior surface of housing 20 is smooth and interior surface of the housing 20 is ribbed and/or rippled to provide additional surface area for receiving the coating 24. In an example embodiment, the coating 24 may be in thermal communication with the heat sink 40 such that the coating 24 may receive heat from the heat sink 40 and disperse the heat through the housing 20.

In an example embodiment, the backlit lamp 10 further comprises an optical element 12. In an example embodiment, the optical element 12 may be configured to enclose, seal, and/or the like the forward emitting end 28 of the housing 20. For example, the optical element 12 may be secured to the housing 20 (e.g., using an adhesive and/or the like) such that an opening of the forward emitting end 28 of the housing 20 is enclosed, sealed, and/or the like by the optical element 12. For example, in various embodiments, the optical element 12 maybe secured via a snap-on connection, a friction fit, adhesive, and/or the like to the forward emitting end 28 of the housing 20.

In various embodiments, the surface of the optical element 12 may be textured or patterned. For example, the surface of the optical element 12 may have a uniform or irregular pattern, texture, or translucent/opaqueness pattern may thereon. In other embodiments, the surface of the optical element 12 may be substantially smooth, as may be desirable in certain applications. In an example embodiment, the optical element 12 may be a lens or other optical element configured to condition the light emitted by one or more forward facing LED packages 52. In some embodiments, the optical element 12 may be concave, convex, or substantially flat (e.g., approximately planar) and/or comprise portions that are concave, convex, and/or substantially flat. For example, in embodiments wherein the optical element 12 is substantially flat, the optical element may be approximately a plane that is substantially perpendicular to the longitudinal axis 18. In embodiments wherein the optical element 12 is concave or convex, the optical axis of the optical element may be aligned with the longitudinal axis 18. Therefore, the optical element 12 may be configured to condition the spot light type and/or forward emitted beam of light emitted from the backlit lamp 10.

In various embodiments, the optical element 12 may be configured to act as an optic controller. In various embodiments, the optical element 12 may act to give the appearance of a sharp beam edge without the use of a mask. In various embodiments, the optical element 12 may be made out of glass. In other embodiments, the optical element 12 may be made out of hard glass. In some embodiments, the optical element 12 may be made out of plastic or some other commonly known and used material.

In various embodiments, the optical element 12 may be configured to allow at least a fraction of the light emitted by a directional light source mounted within the housing 20 to pass through the optical element 12. In particular embodiments, the optical element 12 may be configured to allow at least 10% of the light emitted by a directional light source mounted within the housing 20 to pass through the optical element. In various embodiments, the optical element 12 may be configured to allow 10-95% of the light emitted by a directional light source mounted within the housing 20 to pass through the optical element. In other embodiments, the optical element 12 may be configured to allow 5-25%, 20-50%, 40-60%, 50-80% of the light emitted by a directional light source mounted within the housing 20 to pass through the optical element. In some embodiments, the optical element 12 may be configured to allow a significant fraction of light emitted by a directional light source mounted within the housing 20 to pass through the optical element. In particular embodiments, the optical element 12 may be configured to allow greater than 50% or greater than 80% of the light emitted by a directional light source mounted within the housing 20 pass through the optical element. In various embodiments, the translucency of the optical element 12 may not be uniform across the entire optical element. For example, in one embodiment, the center portion of the optical element 12 may be configured to allow 90% of the light incident thereon to pass through the optical element, while the outermost portion of the optical element may be configured to allow less than 5% of the light incident thereon to pass there-through. The translucency of the optical element 12 may vary smoothly, in striations, or irregularly over the surface of the optical element.

In various embodiments, the optical element 12 may be configured to control the beam spread. In some embodiments, the optical element 12 may act as an optics controller. In various embodiments, the optical element 12 may be configured to confine the beam to an angle of 7-70 degrees. In various embodiments, the optical element 12 may be configured to confine the beam to an angle of less than 8 degrees. In other embodiments, the optical element 12 may be configured to confine the beam to an angle of 8-15 degrees, 8-20 degrees, 24-30 degrees, 35-40 degrees, or 55-60 degrees. In yet other embodiments, the optical element 12 may be configured to confine the beam to an angle of greater than 60 degrees (e.g., 68 degrees) or any angle appropriate for the application. For example, in some embodiments, the optical element 12 may be transparent and/or translucent across the entire optical element. In other embodiments, the optical element 12 may be at least partially opaque around the edge of the optical element and transparent and/or translucent in the center of the optical element. For example, different portions of the optical component 12 may have different optical properties. For example, the optical element 12 may be configured to allow more light to pass through the center of the optical element and less light to pass through the edge of optical element. In some embodiments, the shape of the optical element (e.g., concave, convex, or substantially flat) may be configured to control the beam. For example, the curvature of the optical element 12 and/or portions thereof may be configured to focus the forward emitted beam of light emitted by the backlit lamp 10 into a beam of a particular opening angle, width, and/or the like. In an example embodiment, the bowl portion 22, coating 24, and/or other component of the backlit lamp 10, may be configured to condition the forward emitted beam of light emitted by the backlit lamp 10 in place of and/or in addition to the optical component 12.

FIGS. 7A, 7B, 7C, and 7D illustrate various views of an exemplary optical component 12. As noted above, the optical component 12 is configured to enclose, seal, and/or the like, the forward emitting end 28 of the housing 20. In the illustrated embodiment, the optical component 12 comprises a sealing portion 80 and a light conditioning portion 81. The sealing portion comprises a sealing surface 86 configured to be mounted, sealed, secured and/or the like adjacent to, and/or in direct contact with the housing 20 at the forward emitting end 28. In various embodiments, the sealing surface 86 may be mounted, sealed, secured, and/or the like to the forward emitting end 28 using an adhesive, friction fit, mechanical fastener, and/or the like. In particular, the sealing portion 80 may be mounted, sealed, secured, and/or the like to the housing 20 such that the forward emitting end 28 is sealed against dirt, moisture, and/or the like. In the illustrated example embodiment, the sealing surface 86 is disposed on the rear facing surface 85 of the optical element 12. In other embodiments, the sealing surface 86 may be disposed on a perimeter surface extending between the forward facing surface 82 and the rear facing surface 85 or on the forward facing surface 82, depending on the geometry of the forward emitting end 28 of the housing and the intended mounting, sealing, and/or securing mechanism.

In the illustrated example embodiment, the sealing portion 80 is generally annular and the light conditioning portion 81 is generally a disc disposed within the annulus of the sealing portion 80. In an example embodiment, the forward facing surface 82 portion of the light conditioning portion 81 comprises a sloping surface 83 that slopes generally into the disc of the light conditioning portion 81 from the edge of the sealing portion 80 to the edge of the raised central surface 84. The sloping surface 83 may be configured to direct any light emitted there-through in the forward emitting direction to be directed generally toward the center of the beam of light emitted through the forward emitting end 28 of the backlit lamp 10. For example, the sloping surface 83 may be configured to use refraction to help collimate and/or control the beam angle α of a spot light type beam of light emitted through the forward emitting end 28 of the backlit lamp 10.

The forward facing surface 82 may further comprise a raised central surface 84. In an example embodiment, the raised central surface 84 is raised with respect to the portion of the sloping surface 83 directly adjacent the raised central surface 84. In an example embodiment, the raised central surface is generally level with a portion of the sloping surface 83 that is directly adjacent to the sealing portion 80. In an example embodiment, the forward facing surface 82 of the raised central portion 84 is generally planar. In an example embodiment, the forward facing surface 82 of the raised central portion 84 is smooth. In an example embodiment, the forward facing surface 82 of the raised central portion 84 is textured. For example, the forward facing surface 82 of the raised central portion 84 may comprise a plurality of small lenses in a honeycomb-like pattern, be a compound lens, a multi-faceted lens, and/or the like.

The rear facing surface 85 may comprise the sealing surface 86 of the sealing portion 80, as described above, a large ridge 87, a small ridge 88, and a focusing element 89. The large ridge 87 and small ridge 88 may be configured to refract and/or reflect light incident thereon toward the focusing element 89. For example, the large ridge 87 may be disposed toward the outer portion of the disc of the optical element 12 and configured to receive light emitted toward the perimeter portion of the forward emitting end 28 of the housing 20. The light incident on the large ridge 87 may then be reflected and/or refracted toward the focusing element 89. Similarly, the small ridge 88 may be configured to receive light emitted toward a more central region of the forward emitting end 28 of the housing 20 that may not otherwise be incident on the focusing element 89 and reflect and/or refract the light incident thereon toward the focusing element 89.

The rear facing surface 85 of the focusing element 89 may be curved. For example, the rear facing surface 85 of the focusing element 89 may be convex. For example, the focusing element 89 may be a lens and/or the like configured to focus the light incident thereon to provide a beam having the desired beam angle α. In an example embodiment, the perimeter of the focusing element 89 corresponds to the perimeter of the raised central surface 84. For example, light incident upon the focusing element 89 may be conditioned thereby and emitted through the raised central surface 84 as a spot light type light having a beam angle α. As should be understood, the optical element 12 may have a variety of geometries in various embodiments to condition the light emitted through the forward emitting end 28 of the backlit lamp 10, as appropriate for the application.

FIGS. 3, 4, 5A, 5B, and 6 show example embodiments of a backlit lamp 10, or portions thereof, wherein the directional light source mounted within the housing 20 comprises one or more LEDs. For example, the one or more LED packages 52, 62 may be operatively mounted within the housing 20 for providing both a forward emitting spot light type beam of light and a back light. In an example embodiment, an LED package may comprise one or more LED chips, an enclosure, electrical contacts, and optionally phosphor and/or an encapsulant to protect the LED chip(s), the wire bonds, and the phosphor. In an example embodiment, the LED package may comprise one or more optical elements.

In various embodiments, the backlit lamp 10 may comprise a component board 60, a heat sink 40, and a forward facing board 50. The component board 60, heat sink 40, and forward facing board 50 may be mounted within the housing 20. For example, the component board 60 and/or forward facing board 50 may be secured to the heat sink 40. For example, the component board 60 and/or forward facing board 50 may be mounted to the heat sink 40 by a thermally conductive adhesive 25 or by one or more mechanical fasteners. In an embodiment wherein the component board 60 and/or forward facing board 50 is secured to the heat sink 40 using one or more mechanical fasteners, a thermally conductive substance, material, gel, cream, and/or the like may be disposed between the component board 60 and the heat sink 40 and/or the forward facing board 50 and the heat sink 40. Thus, the component board 60 and/or the forward facing board 50 may be in thermal communication with the heat sink 40.

In an example embodiment, the heat sink 40 comprises a bottom portion 44 and a sloped side portion 42. In various embodiments, the bottom portion 44 and the sloped side portion 42 may be integrally formed, welded together, and/or the like. In an example embodiment, the bottom portion 44 is generally planar. In an example embodiment, the bottom portion 44 is shaped similar to the cross-section of the first joining end 36 or other cross-section of the bowl portion 22 taken perpendicular to the longitudinal axis 18. In an example embodiment, the sloped side portion 42 extends from a perimeter of the bottom portion 44. For example, the sloped side portion 42 may extend forward from the bottom portion 44 at an angle β. In an example embodiment, the angle β is greater than 45° and less than 90°. Thus, in various embodiments, the heat sink 40 is bowl-shaped, such that an interior portion of the heat sink 40 may be defined. In an example embodiment, the heat sink 40 is made of aluminum, another light weight metal, or other appropriate material.

The heat sink 40 may be mounted within the housing 20. For example, the heat sink 40 may be mounted within the housing 20 using an adhesive, friction fit, mechanical fastener and/or the like. In an example embodiment, a thermally conductive adhesive and/or other thermally conductive material may be used to mount the heat sink 40 within the housing 20 such that the heat sink 40 is in thermal contact with the coating 24 of bowl portion 22. In an example embodiment, an exterior surface 43 of the sloped portion 42 may be disposed adjacent the interior surface 23 of the bowl portion 22 when the heat sink 40 is mounted within the housing 20. For example, the bottom portion 44 of the heat sink may be positioned adjacent to and/or approximately at the first joining end 26 of the bowl portion 22 when the heat sink 40 is mounted within the housing 20. When the heat sink 40 is mounted within the housing 20, the bottom portion 44 is disposed closer to the base end 38 than the end of the sloped side portion 42 that is not adjacent the bottom portion 44. Thus, the bottom portion 44 of the heat sink 40 comprises a rear facing surface 48 and a forward facing surface 46. The forward facing surface 46 faces the cavity defined by the bottom portion 44 of the heat sink and the bowl portion 22 of the housing 20. In other words, the normal vector to the forward facing surface 46 points toward the forward emitting end 38. The rear facing surface 48 faces the neck portion 32 of the housing 20. In other words, the normal vector to the rear facing surface 48 points toward the base end 38. For example, the sloped side portion 42 of the heat sink 40 borders the forward facing surface 46 of the bottom portion 44.

In various embodiments, one or more circuit boards (e.g., forward facing board 50, rear facing board 60) may be mounted to the heat sink 40. For example, the heat sink 40 may be in thermal communication with one or more circuit boards. In particular, the heat sink 40 may be configured to receive heat emitted by one or more LED packages 52, 62, driver circuitry components 64, and/or the like. In an example embodiment, the heat sink 40 may be configured to provide heat produced by the electrical components of the backlit lamp 10 (e.g., one or more LED packages 52, 62, driver circuitry components 64, and/or the like) to the environment around the backlit lamp 10. In an example embodiment, the heat may be passed to a coating 24 of the bowl portion 22 and then radiated away from the backlit lamp 10 through the housing 20. The heat sink 40 may provide for controlling the accumulation of heat within the housing 20 and/or within the vicinity of the electrical components of the backlit lamp 10 using various heat communication techniques (e.g., radiation, convection, and/or conduction).

In an example embodiment, a forward facing board 50 is mounted to the forward facing surface 46 of the heat sink 40. For example, the forward facing board 50 may be a printed circuit board (PCB), in an example embodiment. In an example embodiment, one or more forward facing LED packages 52 may be operatively mounted to the forward facing board 50. The one or more forward facing LED packages 52 may be configured to emit light in the direction of the forward emitting end 28. For example, the one or more forward facing LED packages 52 may be configured to emit light toward the optical component 12 such that the light is then condition by the optical component 12 and emitted from the forward emitting end 28 of the backlit lamp 10. For example, the optical component 12 may condition the light emitted by the one or more forward facing LED packages 52 to provide a spot light style light beam.

For example, the one or more forward facing LED packages 52 may be mounted within the housing 20 such that light emitted by the forward facing LED package(s) 52 is generally directed toward the optical element 12. In various embodiments, the one or more LED packages 52 may emit light having a light temperature of 2800-3200 K. In other embodiments, the one or more LED packages 52 may emit light having a light temperature of around 2000-2800 K. In still other embodiments, the one or more LED packages 52 may emit light having a light temperature of around 3000-7000 K.

In yet other embodiments, the one or more LED packages 52 may emit colored light, such as a red, green, blue, and/or the like. In various embodiments, the one or more LED packages 52 may emit light having different color temperatures, different colors, and/or the like. For example, one embodiment may have three red LED packages, three green LED packages and 10 white LED packages mounted to a forward facing board 50. In some such embodiments, the different color LED packages may be controlled independently. For example, in such an embodiment, any red LED packages mounted to the forward facing board 50 may be controlled independently from any green LED packages mounted to the rear facing board 50, or the like.

In various embodiments, the one or more forward facing LED packages 52 may be configured to provide light of at least 200 lumens. In some embodiments, the one or more forward facing LED packages 52 may be configured to provide light of at least 1,000 lumens. In other embodiments, the one or more forward facing LED packages 52 may be configured to provide light of at least 2,500 lumens. In still other embodiments, the one or more forward facing LED packages 52 may be configured to provide light of at least 5,000 lumens. In yet other embodiments, the one or more forward facing LED packages 52 may be configured to provide light of at least 7,500 lumens. In still other embodiments, the one or more forward facing LED packages 52 may be configured to provide a beam of any of a variety of lumens, as may be desirable for various applications. For example, in an example embodiment, the backlit lamp 10 may be dimmable.

In an example embodiment, the bottom portion 44 of the heat sink 40 may comprise a lead passage 47. For example, the lead passage 47 may be an opening, orifice, or hole that passes through the bottom portion 44 of the heat sink from the rear facing surface 48 to the forward facing surface 46 (or vice versa) such that forward electrical leads 56 may pass there-through. In an example embodiment, the forward electrical leads 56 are configured to provide an electrical current to the forward facing board 50. For example, the component electrical leads 66 may provide an electrical current from the electrical contacts 16 to the component board 60. One or more circuit elements comprising driver circuitry components 64 may receive the electrical current from the component electrical leads 66. The driver circuitry components 64 may then condition the electrical current and provide at least a portion of the conditioned electrical current to the forward electrical leads 56. The forward electrical leads 56 may then provide the conditioned electrical current, and/or portion thereof, to the forward facing board 50 and/or the one or more forward facing LED packages 52.

In an example embodiment, a component board 60 is also mounted to the rear facing surface 48 of the heat sink 40. For example, the rear facing board 60 may be a PCB, in an example embodiment. In an example embodiment, at least one rear facing LED package 62 may also be operatively mounted to the component board 60, such that the at least one rear facing LED package 62 is adjacent and/or extending from the rear facing surface 48 of the heat sink 40. In this manner the at least one rear facing LED package 62 may be, in certain embodiments, oppositely oriented relative to one or more forward facing LED packages 52. In an example embodiment, one or more driver circuitry components 64 are operatively mounted to the component board 60.

The at least one rear facing LED package 62 may be configured to emit light in the direction of the base end 38. For example, the at least one rear facing LED package 62 may be configured to emit light toward the neck cavity 33 such that the light is emitted from the backlit lamp 10 through the sidewall 34 of the neck portion 32 of the housing 20. For example, the at least one rear facing LED package 62 may be configured to emit light that provides the backlighting of the backlit lamp 10. In an example embodiment, the light emitted from the back, rear, and/or base end 38 of the housing 20 may be more diffuse and of fewer lumens than the light emitted through the optical component 12 and the forward emitting end 28 of the housing 20. In certain embodiments, the at least one rear facing LED package 62 emits light in a direction substantially opposite that of the direction of light emitted via the at least one forward facing LED packages 52.

For example, the at least one rear facing LED package 62 may be mounted within the housing 20 such that light emitted by the at least one rear facing LED package 62 is generally directed toward the base end 38. In various embodiments, the at least one rear facing LED package 62 may emit light having a light temperature of 2800-3200 K. In other embodiments, the at least one rear facing LED package 62 may emit light having a light temperature of around 2000-2800 K. In still other embodiments, the at least one rear facing LED package 62 may emit light having a light temperature of around 3000-7000 K.

In yet other embodiments, the at least one rear facing LED package 62 may emit colored light, such as a red, green, blue, and/or the like. In various embodiments, the at least one rear facing LED package 62 may emit light having different color temperatures, different colors, and/or the like. For example, one embodiment may have a red LED package, a green LED package and a white LED package mounted to a component board 60. In some such embodiments, the different color LED packages may be controlled independently. For example, in such an embodiment, any red LED packages mounted to the component board 60 may be controlled independently from any green LED packages mounted to the component board 60 and/or the forward facing board 60, or the like. These may also all be characteristics of the at least one forward facing LED packages 52 according to various embodiments.

In various embodiments, the at least one rear facing LED package 62 may be configured to provide light of at least 200 lumens. In some embodiments, the at least one rear facing LED package 62 may be configured to provide light of at least 1,000 lumens. In other embodiments, the at least one rear facing LED package 62 may be configured to provide light of at least 2,500 lumens. In still other embodiments, the at least one rear facing LED package 62 may be configured to provide light of at least 5,000 lumens. In yet other embodiments, the at least one rear facing LED package 62 may be configured to provide light of at least 7,500 lumens. In still other embodiments, the at least one rear facing LED package 62 may be configured to provide a beam of any of a variety of lumens, as may be desirable for various applications. For example, in an example embodiment, the backlit lamp 10 may be dimmable. In an example embodiment, the light emitted by the forward facing LED package(s) 52 may be independently dimmable with respect to the at least one rear facing LED package 62. These may also all be characteristics of the at least one forward facing LED packages 52 according to various embodiments.

In various embodiments, the backlit lamp 10 may comprise driver circuitry mounted within the housing 20. In an example embodiment, the driver circuitry comprises one or more driver circuitry components 64. The one or more driver circuitry components 64 may be mounted to the component board 60. In an example embodiment, the component board 60, may be positioned within the housing 20 such that the neck cavity 33 does not contain any driver circuitry components 64. For example, the component board 60 may be mounted proximate the first and/or second joining end 26, 36 and/or within the bowl portion 22 such that a neck cavity 33 exists between the base end 38 and the driver circuitry components 64. Moreover, the driver circuitry components 64 are mounted and/or disposed within the housing 20 and/or to the component board 60 such that the driver circuitry components 64 do not prevent the light emitted by the at least one rear facing LED package 62 from being emitted through the sidewall 34 of the neck portion 32.

In various embodiments of the backlit lamp 10, the driver circuitry may be configured to condition and/or control the electrical current received from the electrical power source (e.g., via the electrical contacts 16 of the base 14 and the component electrical leads 66) and provided to the at least one rear facing LED package 62 and/or the one or more forward facing LED packages 52.

In various embodiments, driver circuitry may comprise various circuitry portions. In various embodiments, driver circuitry may comprise circuitry portions, driver circuitry components 64 and/or groups of driver circuitry components 64 configured to convert alternating current to direct current, convert the electrical power received via the electrical power source (e.g., via the electrical contacts 16 of the base 14 and the component electrical leads 66), and/or control the light function of the LED packages 52, 62, such as allowing the LEDs to be dimmed or the like. The driver circuitry may comprise circuitry portions, driver circuitry components 64 and/or groups of driver circuitry components 64 which are distinct and/or configured to enact various functions, such as the examples listed above, with a single circuitry portion, driver circuitry component 64 and/or group of driver circuitry components 64. A variety of driver circuitry is known and well understood in the art.

While example embodiments of the backlit lamp 10 are described above wherein the light emitted through the sidewall 34 to provide the backlighting is provided by at least one LED package that is distinct from the forward facing LED package(s) 52, an example embodiment is contemplated in which the forward facing LED package(s) 52 also provide the backlighting. For example, the forward facing board 50, heat sink 40, and component board 60 may comprise a hole there-through. For example, the forward facing board 50, bottom portion 44 of the heat sink 40, and component board 60, may be annular in shape. A portion of the light emitted by the forward facing LED package(s) 52 may then pass through the hole through the forward facing board 50, heat sink 40, and component board 60 and be emitted through the sidewall 34 as backlighting.

In another example embodiment, the component board 60 and the bottom portion 44 of the heat sink 40 may comprise a hole there-through and at least one rear facing LED package 62 may be mounted to the backside of the forward facing board 50 such that the at least one rear facing LED package 62 is disposed within the hole in the component board 60 and the bottom portion 44 of the heat sink 40. Thus, the light emitted by the rear facing LED package 62 may be emitted toward the base end 38 and be emitted through the sidewall 34 to provide the backlighting of the backlit lamp 10.

In yet another example embodiment, the heat sink 40 may comprise a sloped side portion 42 and not comprise a bottom portion 44. In a similar example embodiment, the heat sink 40 comprises a sloped side portion 42 and an annular bottom portion 44 with an interior radius that is at least half the length of the exterior radius. A double-sided board may be mounted to the heat sink 40. The double-sided board may have one or more forward facing LED packages 52 operatively mounted to the forward facing side of the double-sided board. The double-sided board may further have at least one rear facing LED package 62 and one or more driver circuitry components 64 mounted to the rear facing side of the double-sided board. Thus, it should be understood that various embodiments comprise various heat sink, circuit board, and/or LED package configurations such that a directional light may be emitted through forward emitting end 28 and/or the optical component 12 and a diffuse backlight may be emitted through the sidewall 34 of the neck portion 32 of the housing 20 (e.g., via the neck cavity 33). In particular, in various embodiments, the heat sink 40, LED packages 52, 62, and driver circuitry components 64 are mounted within the housing 20 within the bowl portion 22, proximate the first joining end 26, proximate the second joining end 36, and/or the like such that the neck cavity 33 is free of obstructions that may prevent the light emitted by the at least one rear facing LED package 62 from being emitted through the sidewall 34.

Example embodiments provide a backlit lamp using directional light sources, such as LEDs. Example embodiments of the backlit lamp 10 overcome a variety of difficulties to provide lamp having sufficient backlighting while still providing an energy efficient lamp. In particular, the positioning of the light sources, such as the LED packages, is configured to provide sufficient backlighting. Moreover, when LED packages are used as the directional light source, the positioning of the driver circuitry components 64 within the housing 64 is configured to prevent the blocking of light from being emitted through the neck portion 32 to provide the sufficient backlighting. Moreover, when LED packages are used as the directional light source, the heat management of the lamp also becomes important. In particular, the heat emitted by the electrical components of the lamp (e.g., the LED packages, driver circuitry components, and/or the like) must be managed to prevent the temperature in the vicinity of the LED packages from becoming elevated. In particular, when LED packages are operated at high temperatures the efficiency and the reliability of the LED package is reduced. Example embodiments of the backlit lamp 10 are configured to provide a lamp that has appropriate heat management, driver circuitry component placement, and lighting source positioning to provide an energy efficient and aesthetically pleasing backlit lamp.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of assembling a housing comprising:

providing a bowl portion comprising a forward end and a sloped interior surface;

positioning at least one rear facing LED package facing away from the forward end; and providing a heat sink having a bottom portion comprising a rear surface and a forward surface, a sloped surface, and a portion other than the rear surface, wherein the sloped interior surface of the bowl portion is at least partially covered with a reflective coating, and the sloped surface of the heat sink extends from a perimeter of the bottom portion and borders the forward surface, and mounting the portion of the heat sink other than the rear surface of the heat sink to the bowl portion by a thermally conductive material other than the reflective coating, such that heat emitted by the at least one rear facing LED package is passed, via the heat sink, to the coating.

2. The method of claim 1, wherein one or more forward facing LED packages facing toward the forward end are mounted on a forward board, such that the forward end defines an emitting end, the at least one rear facing LED package is mounted on a component board, the forward board is mounted to the forward surface, and the component board is mounted to the rear surface.

3. The method of claim 2, further comprising one or more driver circuit components, the one or more driver circuit components being mounted on the component board.

4. The method of claim 1, wherein the sloped interior surface of the bowl portion is a material selected from the group consisting of: plastic, ceramic material, metal, aluminum, glass, and hard-pressed glass.

5. The method of claim 1, wherein:

the bowl portion comprises a first joining end, the housing further comprises a neck portion comprising a second joining end, the bowl portion and the neck portion are joined at the first joining end and the second joining end, and the neck portion further comprises a base end disposed opposite the second joining end and a neck cavity disposed between the base end and the second joining end.

6. The method of claim 5, wherein the neck cavity comprises an open space having component electrical leads passing there-through.

7. The method of claim 6, wherein the component electrical leads provide electrical communication between one or more electrical contacts of a base secured to the base end and one or more driver circuitry components mounted within the housing.

8. The method of claim 6, wherein electrical leads for the one or more forward facing LED packages pass through an opening from the rear surf ace to a forward surface of the heat sink.

9. The method of claim 5, wherein the neck cavity does not contain any driver circuitry components.

10. The method of claim 5, wherein a sidewall of the neck portion is (a) clear or (b) frosted.

11. The method of claim 1, wherein the reflective coating is an aluminum coating and the housing further comprises an optical component enclosing the forward end.

12. A housing comprising:

a light source facing away from an opening of the housing; and a heat sink having a bottom portion comprising a rear surface and a forward surface, a sloped surface, and a portion other than the rear surface, wherein:

the housing further comprises a bowl portion comprising a forward end and a sloped interior surface, the sloped interior surface of the bowl portion being at least partially covered with a reflective coating, the sloped surface of the heat sink extends from a perimeter of the bottom portion and borders the forward surface, and the portion of the heat sink other than the rear surface is mounted to the housing by a thermally conductive material other than the coating, such that heat emitted by the light source is passed, via the heat sink, to the coating.

13. The housing of claim 12, wherein:

the bowl portion comprises a first joining end, the housing further comprises a neck portion comprising a second joining end, the bowl portion and the neck portion are joined at the first joining end and the second joining end, the neck portion further comprises a base end and a sidewall extending between the base end and the second joining end, at least a portion of light emitted by the rear facing directional light source passes through the sidewall; and the sidewall of the neck portion is (a) clear or (b) frosted.

14. The housing of claim 12, wherein the reflective coating is an aluminum coating.

15. The housing of claim 12, further comprising an optical component enclosing the forward end.

16. The housing of claim 12, wherein:

the bowl portion comprises a first joining end, the housing further comprises a neck portion comprising a second joining end, the bowl portion and the neck portion are joined at the first joining end and the second joining end, and the neck portion further comprises a base end disposed opposite the second joining end and a neck cavity disposed between the base end and the second joining end.

17. The housing of claim 16, wherein the neck cavity comprises an open space having component electrical leads passing there-through.

18. The housing of claim 17, wherein the electrical leads provide electrical communication between one or more electrical contacts of a base secured to the base end and the rear facing directional light source.

19. The housing of claim 12, wherein:

a second light source faces toward the forward end; and electrical leads for the forward directional light source pass through an opening from the rear surface of the heat sink to a forward surface of the heat sink.

* * * * *